United States Patent
Uejima et al.

(10) Patent No.: US 7,516,841 B2
(45) Date of Patent: Apr. 14, 2009

(54) CONNECTING FASTENER AND FASTENER HOLDER

(75) Inventors: Yasutsugu Uejima, Osaka (JP); Keiji Yamakawa, Hyogo (JP)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/572,363

(22) PCT Filed: Sep. 16, 2004

(86) PCT No.: PCT/IB2004/003016

§ 371 (c)(1),
(2), (4) Date: Aug. 9, 2007

(87) PCT Pub. No.: WO2005/028160

PCT Pub. Date: Mar. 31, 2005

(65) Prior Publication Data

US 2008/0029414 A1    Feb. 7, 2008

(30) Foreign Application Priority Data

Sep. 19, 2003    (JP)    ............................ 2003-328770

(51) Int. Cl.
*B65D 85/00* (2006.01)
(52) U.S. Cl. ................. 206/338; 206/346; 206/347; 411/442
(58) Field of Classification Search ............ 206/345, 206/346, 347, 341, 342, 338; 411/442, 443, 411/444, 966
See application file for complete search history.

(56) References Cited

U.S. PATENT DOCUMENTS

| | | | | |
|---|---|---|---|---|
| 4,162,728 A | * | 7/1979 | Uzumcu et al. | 206/345 |
| 4,343,579 A | * | 8/1982 | Shelton et al. | 411/442 |
| 4,403,694 A | * | 9/1983 | Schmale | 206/347 |
| 4,913,611 A | * | 4/1990 | Leistner | 411/442 |
| 4,915,561 A | * | 4/1990 | Buhri et al. | 411/439 |
| 5,096,061 A | * | 3/1992 | Wakai | 206/347 |
| 5,779,420 A | * | 7/1998 | Huang | 411/442 |

(Continued)

FOREIGN PATENT DOCUMENTS

GB    2 173 761 A    10/1986

(Continued)

*Primary Examiner*—Jacob K Ackun, Jr.

(57) ABSTRACT

To improve the function whereby each of the nails (2) is retained at a position which is vertical to both belt-shaped bodies (5,5) in the connecting nail (1) which is provided with multiple nails (2) with a head part (3) attached and two band-shaped belt-shaped bodies (5,5) which are made of a synthetic resin. This invention is provided with two belt-shaped bodies (5,5) which are disposed so that they are separate from one another in the axial direction of the nail (2) and parallel to one another and at the same time, multiple nail through holes (6a) are formed at appropriate intervals. Multiple cylindrical gripping parts (7) which communicate with the nail through holes (6a) and which can grip the shaft part (4) of the nail (2) are formed on both belt-shaped bodies (5,5). The shaft part 4 of the nail (2) is supported at two locations: one location which approaches the heat part and another location which approaches the front end at two gripping parts (7,7) which are aligned in a single row along the axial direction of each of the nails (2) of both belt-shaped bodies (5,5).

20 Claims, 8 Drawing Sheets

U.S. PATENT DOCUMENTS

| | | | | |
|---|---|---|---|---|
| 5,788,445 A | * | 8/1998 | Huang | 411/442 |
| 5,803,691 A | * | 9/1998 | Huang | 411/442 |
| 5,836,732 A | * | 11/1998 | Gupta et al. | 411/443 |
| 5,921,736 A | * | 7/1999 | Habermehl | 411/442 |
| 5,931,298 A | * | 8/1999 | Huang | 206/346 |
| 5,931,622 A | * | 8/1999 | Gupta et al. | 411/443 |
| 5,984,096 A | * | 11/1999 | Shinjo | 206/347 |
| 6,705,464 B1 | * | 3/2004 | Yang | 206/345 |
| 2003/0116458 A1 | * | 6/2003 | Donner | 206/345 |
| 2004/0118720 A1 | * | 6/2004 | Powers et al. | 206/346 |

FOREIGN PATENT DOCUMENTS

| | | |
|---|---|---|
| JP | 6-35623 | 5/1994 |
| JP | 7-23606 | 5/1995 |
| JP | 2520358 | 5/1996 |

\* cited by examiner

CONNECTING FASTENER AND FASTENER HOLDER

RELATED APPLICATIONS

The present application is based on International Application No. PCT/IB2004/003016 filed Sep. 16, 2004, and claims priority from, Japanese Application Number 2003-328770, filed Sep. 19, 2003, the disclosure of which is hereby incorporated by reference herein in its entirety.

TECHNICAL FIELD

The present invention relates to a connecting fastener which is used for a power operated driving tool which continuously drives fasteners such as nails and screws which have a head part on one end of a shaft part and particularly to a fastener holder used for this connecting fastener.

BACKGROUND OF THE INVENTION

In the prior art, connecting fasteners which are used in electric, pneumatic and other power operated driving tools were provided with (a) multiple fasteners with heads attached; (b) a fastener holder which retained these groups of fasteners so that they formed a set and so that the position was arrayed in parallel at appropriate intervals.

An example of the connecting screw as this type of connecting fastener is disclosed in Patent Document 1. In this example, multiple screws are planted at appropriate intervals on a band-shaped body made of a soft synthetic resin. A cylindrical body which passes through the through holes which the screw passes through and which is able to grasp the shaft part of the screw is formed on the band-shaped body. Slits which make it easy for the head part of the screw to pass through are formed around each of the cylindrical parts.

An example of a connecting nail which is used as a connecting fastener is disclosed in Patent Document 2. In this example, multiple nails are planted at appropriate intervals on a connecting body which when seen in schematic cross-section is shaped like a box with the left hand side missing which is made of a plastic sheet. Slits which make it easy for the head part of the nail to pass through are formed around through holes through which nails on the connecting body pass through.

The connecting fastener described in Patent Document 1 and Patent Document 2 is mounted on a power-operated driving tool before using. By intermittently transferring the connecting fastener which is mounted on the power operated driving tool, the fasteners are driven out from the heads of the power operated driving tool. When the fasteners are being driven, the band-shaped body and the connecting body remain inside the power operated driving tool and only one fastener is driven to the outside.

A structure which connects multiple nails by two connecting bodies is disclosed in Patent Document 3 as another example of the connecting nail. Both of the connecting bodies in this example have a structure which features adjacent thin ring-shaped unit holders which are disposed so that they are parallel to one another via a bridging part which cuts by driving using the power operated driving tool. Each of the nails fits into two unit holding parts which appear to overlap when seen from the direction in which both connecting bodies are arranged so that they are arranged at appropriate intervals. As a result, each of the nails supports (a) a part which approaches the head part of the shaft part and (b) a member which approaches the front end by two thin ring-shaped unit retaining parts.

The connecting nail which is described in Patent Document 3 is used by mounting onto a nail driving device which is used as a power operated driving tool. When the nails are being driven, the bridging part which connects to each of the unit holding parts to the nails which have been driven are clamped between the head part of the aforementioned nail and the surface of the member.

BRIEF DESCRIPTION OF THE INVENTION

However, even when any of the structures indicated in Patent Documents 1 through 3 are used there were problems in that the band-shaped body and the connecting body could retain only a very small part of the shaft part of the nail so that the retaining performance whereby the fasteners are retained at a position which is vertical to the band-shaped body and the connecting body was poor and it was difficult to drive the fastener directly to the member (the fastener dangles and the driving performance is poor).

Therefore, it is the technical objective of the present invention to resolve these problems and to provide a connecting fastener which is capable of carrying out the driving operations with a greater degree of precision.

In order to solve these technical problems, the connecting fastener indicated in Claim 1 of the present invention is provided (a) multiple fasteners with head parts attached and (b) fastener holders which retain these groups of fasteners so that they are positioned to form a set and so that they are disposed so that they are parallel to each another at appropriate intervals. The aforementioned connecting fasteners are transferred intermittently in a state whereby they are retained so that they are mounted onto the power operated driving tool.

In the invention indicated in Claim 1, the aforementioned fastener holder is disposed so that it separates from the axial direction of the aforementioned fastener so that it is parallel with it and it is provided with multiple belt-shaped parts on which are formed multiple fastener through holes at appropriate intervals. Then, many cylindrical grasping parts which communicate with the aforementioned fastener through holes and which can grasp the shaft part of the aforementioned fasteners are formed on at least one of the belt-shaped parts.

In the invention indicated in Claim 2, the aforementioned fastener holder is provided with two separate belt-shaped parts on the connecting fastener described in Claim 1. The two belt-shaped parts are made of a soft synthetic resin. A group of the aforementioned gripping parts is burr processed on at least one belt-shaped part. Then, a weakened part which is broken when the aforementioned fastener is driven is formed at a site between the adjacent fastener through holes which are on the aforementioned belt-shaped part.

The invention indicated in Claim 3 relates to a fastener holder which is made of a soft synthetic resin which retains the multiple fasteners with head parts attached so that they are positioned to form a set and so that they are parallel to one another at appropriate intervals. This fastener holder is provided with a belt-shaped part which is formed so that multiple fasteners through holes are formed at appropriate intervals. Multiple cylindrical gripping parts are formed on the aforementioned belt-shaped part so that they communicate with the aforementioned fastener and grip the shaft part of the aforementioned fastener. A weakened part which is cut when the aforementioned fastener is driven is formed at a site between adjacent fastener through holes of the aforementioned belt-shaped part.

When the structure of the present invention is adopted, the multiple belt-shaped parts and the gripping parts which are formed on at least one belt-shaped part support multiple locations along the axial direction of a single fastener so that the gripping area relative to the shaft part of the fastener can be increased. This makes it possible to retain securely the group of the aforementioned fasteners at a position where they are vertical to the aforementioned multiple belt-shaped parts. As a result, the effect of driving one of the aforementioned fasteners straight toward the indicated location can be brought out to its fullest.

In addition, the aforementioned group of fasteners can be connected and retained at a stable position by the aforementioned multiple belt-shaped parts. As a result, the connecting fastener can be manufactured by combining one type of fastener holder with a group of long fasteners with a long shaft part or with a group of fasteners with a short shaft part.

This means that a fastener holder must be manufactured to fit the difference in the length of the shaft part of the fastener. This fastener holder is effective in that it has high flexibility of use and it can contribute to keeping manufacturing costs down.

Next we shall describe a specific practical embodiment of the present invention based on figures.

BRIEF EXPLANATION OF FIGURES

FIG. 7 A diagram indicating another example of the weakened part; (a) plane view; (b) frontal view.

BRIEF DESCRIPTION OF THE INVENTION

Figure 1:
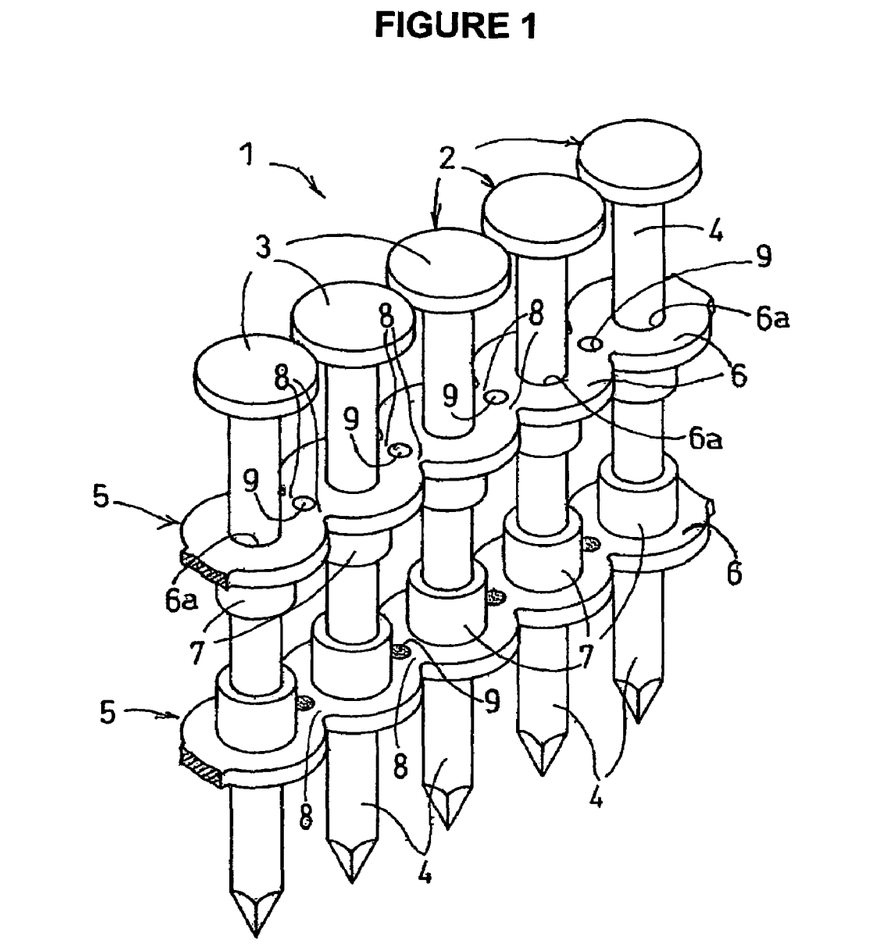
FIG. 1 An inclined view of the connecting nail in the first practical embodiment of the present invention.
Figure 2:
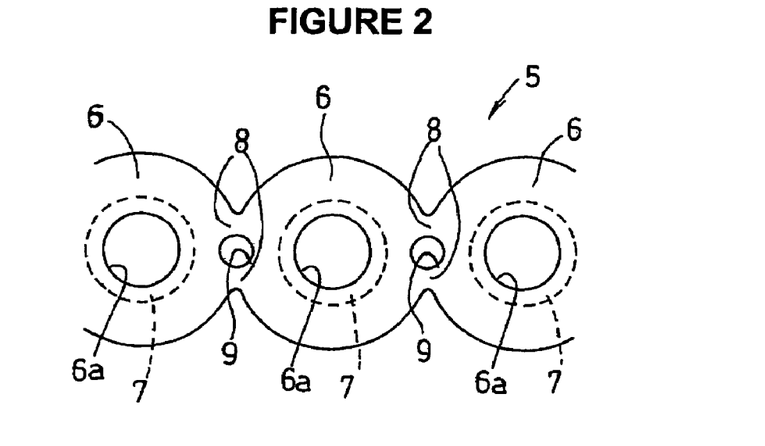
FIG. 2 A plane view of the belt-shaped body.
Figure 3:
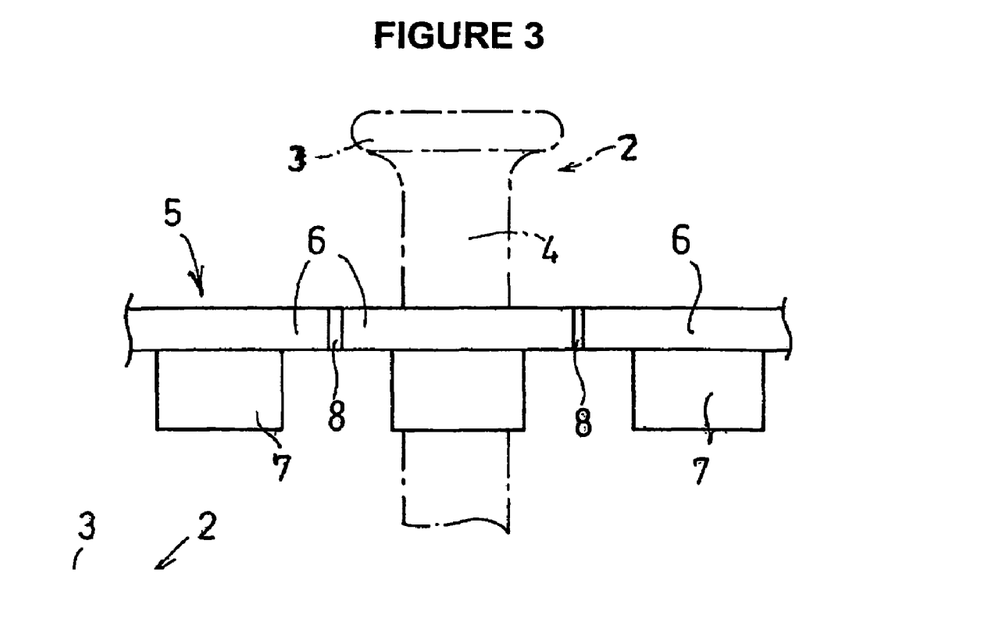
FIG. 3 A frontal view of the belt-shaped body.
Figure 4:
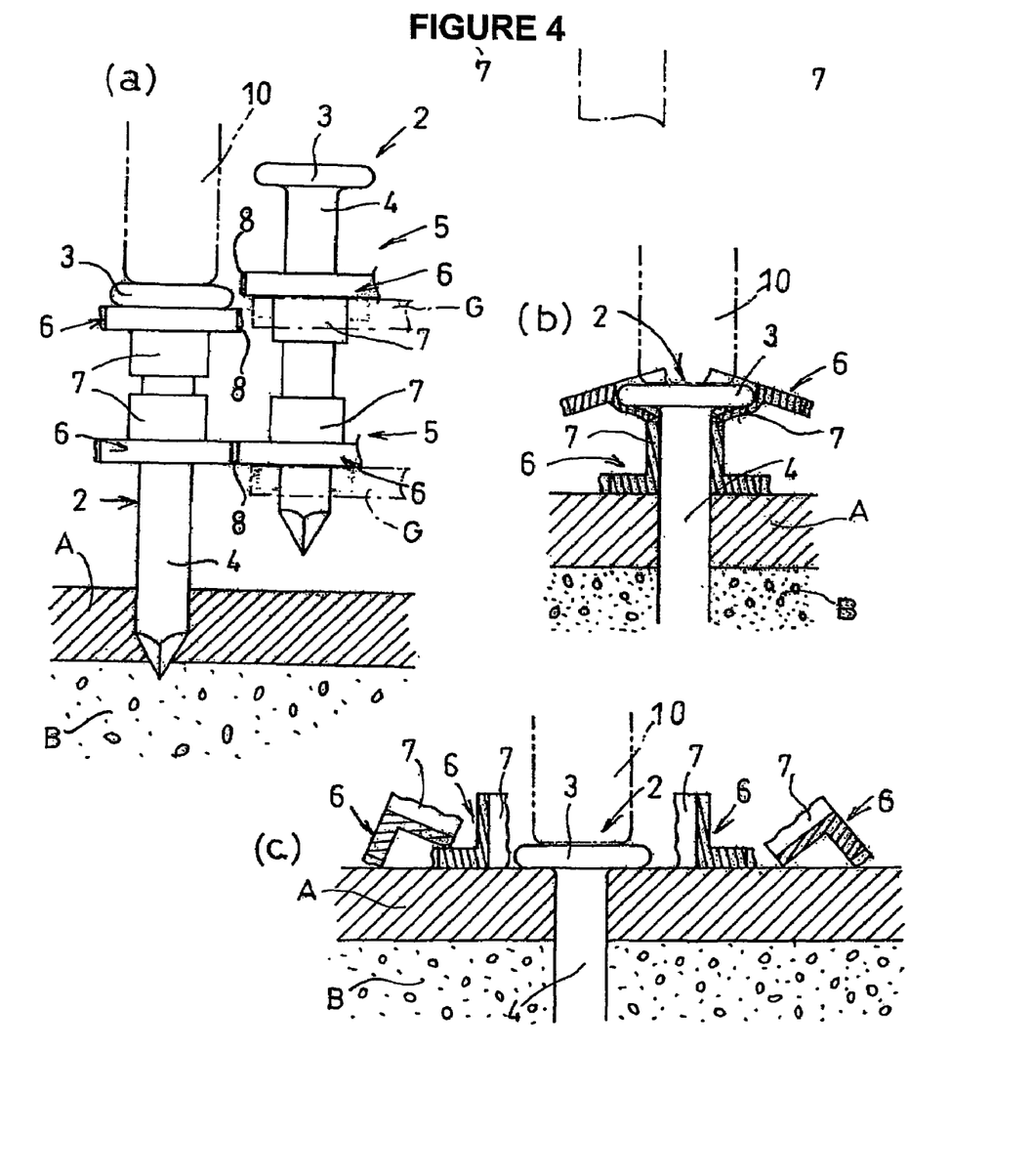
FIG. 4 A diagram indicating an example [of the nail] when being driven.
Figure 5:
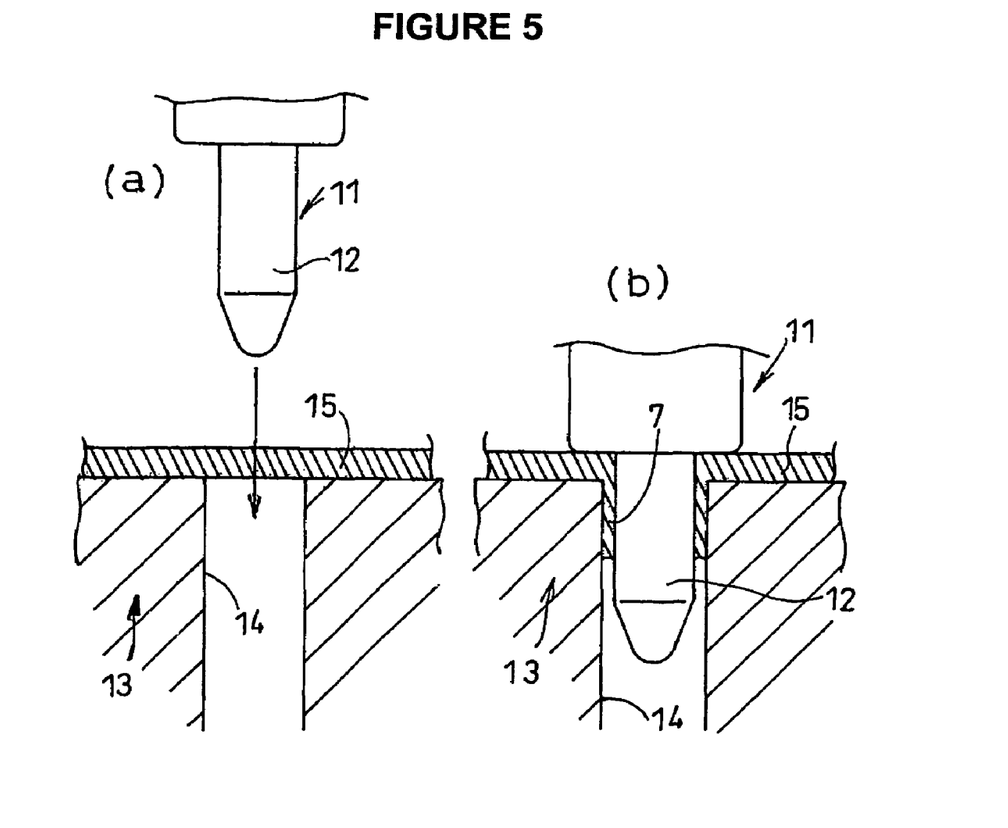
FIG. 5 A diagram indicating the processing for the gripping part.
Figure 6:
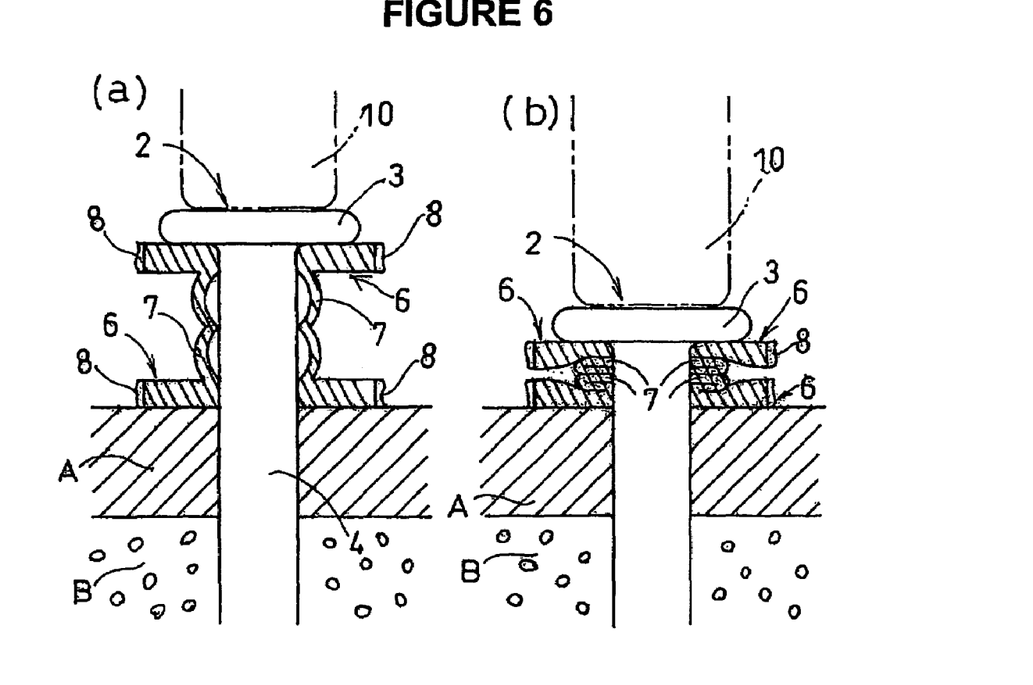
FIG. 6 A diagram indicating another example [of the nail] when being driven.
Figure 7:
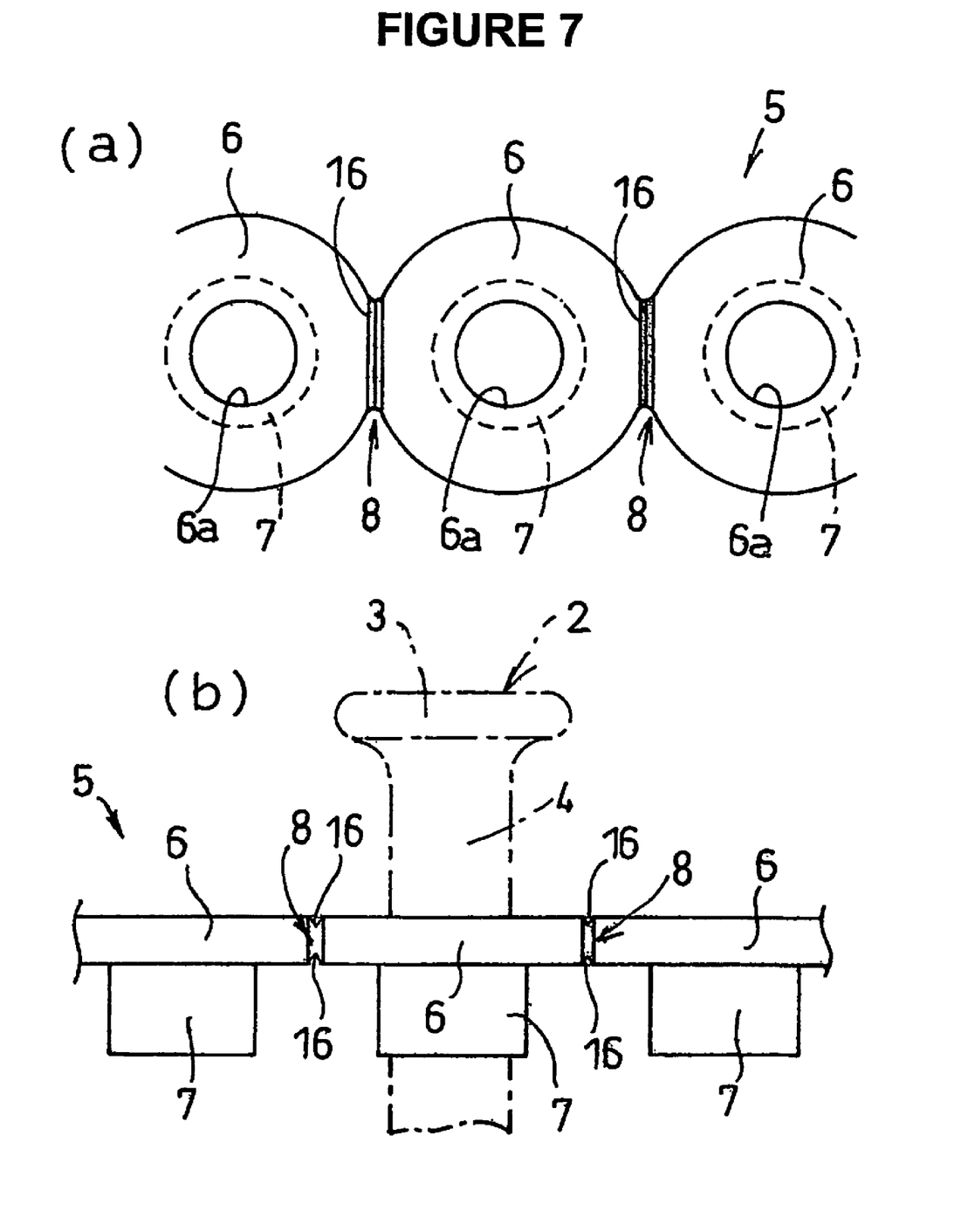

FIG. 1 through FIG. 7 is diagrams of the first practical embodiment of the present invention which is applied to the connecting nail 1. FIG. 1 is an inclined view of the connecting nail in the first practical embodiment. FIG. 2 is a plane view of the belt-shaped body. FIG. 3 is a frontal view of the belt-shaped body. FIG. 4 is a diagram of an example of the invention while it is being driven. FIG. 5 is a diagram indicating the processing of the gripping part. FIG. 6 is a figure indicating another example of the gripping part while it is being driven. FIG. 7 is a diagram of another example of the weakened part. First, we shall give an outline description of the connecting nail 1 referring to FIG. 1 through FIG. 3.

The connecting nail 1 in the first practical embodiment of the present invention is provided with (a) multiple nails 2 which are equipped with a head part 3 on one end of the shaft part 4 and (b) multiple belt-shaped parts 5 (in this embodiment, two parts). The two belt-shaped parts 5,5 are both made of a soft synthetic resin which is flexible (elastic). Thus, in the first practical embodiment of the present invention, the two belt-shaped bodies 5, 5 which correspond to the belt-shaped part which is described in the claims are made as separate pieces. The nail 2 corresponds to the fastener which is described in the claims.

As indicated in FIG. 1, the two belt-shaped bodies 5,5 are disposed so that they are parallel to one another at appropriate intervals. The group of nails 2 is positioned—vis-a-vis both of the belt-shaped bodies 5,5 which are in this state—so that the head part 3 is positioned on one side of one of the belt-shaped bodies 5 and the shaft part 4 passes through both belt-shaped bodies 5,5 and is inserted at appropriate intervals along the lengthwise direction of both belt-shaped bodies 5,5. In other words, the group of nails 2 is disposed in a state where they have a uniform position due to the two belt-shaped bodies 5,5 which are disposed so that they are separate from one another in the axial direction of the nail 2 and so that they are parallel to one another.

Each of these belt-shaped bodies 5 is structured so that multiple adjacent unit retaining parts 6 which are thin and ring-shaped and which are disposed so that they are parallel to one another are linked via weakened part 8 which is cut by the driving of the nail using the power operated driving tool.

A nail through hole 6a which the nail 2 goes through is formed at the schematic center of each of the unit retaining parts 6. A gripping part 7 which can grip the shaft part 4 of a single nail 2 is provided on a single side part of each of the unit retaining parts 6. This gripping part 7 communicates with the nail through hole 6a.

The two gripping parts 7,7 which are arrayed in a single row along the axial direction (insertion direction) of each of the nails 7 of both belt-shaped bodies 5,5 are used to support the shaft part 4 of a single nail 2 at two locations: at one location which approaches the head part and at another location which approaches the front end. In the first practical embodiment of the present invention, the group of gripping parts 7,7 of both belt-shaped bodies 5,5 protrude in a direction so that they are opposite one another along the axial direction of each of the nails 2.

We shall provide the details of these later on, however, each of the gripping parts 7 on the belt-shaped body 5 is formed by burring on a tie plate which is made of a synthetic resin or other material. As a result, the gripping part 7 is thinner than the other sites.

The outside diameter of each of the unit retaining parts 6 is either schematically similar to the head part 3 of the nail 2 or is set to a dimension which is somewhat larger. The two weakened parts 8,8 are formed by opening a through hole 9 on the linking part of the adjacent unit retaining parts 6,6.

Next, we shall describe an example of a mode wherein the nail 2 is driven by referring to FIG. 4. Here, both belt-shaped bodies 5,5 are made of a comparatively hard synthetic resin. Further, in the explanation given further on, we shall call the front side seen from the direction wherein the nail 2 is inserted in the belt-shaped body 5 "up" and the other side "down" for the sake of convenience.

In the connecting nail 1, the nail 2 is attached to the pair of upper and lower gripping parts 7,7 and then is mounted on the driving device (not shown in figure) as a power operated driving tool and is then ready for use. This means that the connecting nail 1 which is mounted onto the driving device is transferred intermittently at a constant pitch to fit the row of intervals of the nail 2 and the nails 2 are provided one by one to the other side of the hammer plate 10 of the driving device. Next, the nail 2 is driven continuously into member A and member B by striking the head part 3 of the hammer plate 10 of the driving device in the axial direction. Both belt-shaped bodies 5, 5 are supported respectively by the guide body G indicated by the dot-and-chain-line in FIG. 4(*a*) inside the magazine of the driving tool.

When the nail 2 is driven in, the weakened parts 8, 8 which are linked to each of the unit retaining parts 6 relative to the nail 2 which has been driven are pushed onto the head part 3 of the nail 2 and are torn off starting from the top (see FIG. 4(*a*)). The two unit retaining parts 6,6 are fitted into the shaft part 4 of the nail which has been driven.

In the first practical embodiment of the present invention, both belt-shaped bodies 5, 5 are made of a hard synthetic plastic so that they are resistant to an external force in the axial direction (axial compression stress is great) and weak relative to a radial outside pushing stress (circumferential shearing stress). For this reason, both the upper and lower unit retaining parts 6,6 are split and broken so that the entire body is torn in the axial direction due to the pressing stress of the head part 3 of the nail 2 as the nailing progresses (see FIG. 4(*b*)). The head part 3 of the nail 2 comes in close contact with the member A on the other side (see FIG. 4(*c*).

Further, since stress is concentrated when the nail is driven and each of the unit retaining parts 6 are readily torn, one or both of the sides of each of the unit retaining parts may have a notched groove (not shown in figure) formed on them.

Thus, according to the structure of the connecting nail 1 which is applied to the present invention, the pair of unit retaining parts 6, 6—upper and lower—on both belt-shaped bodies 5,5 not only support two locations (a location approaching the head part and a location approaching the front end) along the axial direction on the single nail 2 but the gripping parts 7,7 as well which are formed on both unit retaining parts 6,6 support the aforementioned two locations. As a result, the shaft part 4 of the nail 2 can be gripped over a wide range by using these two sets of unit retaining parts 6—upper and lower—and the retaining parts 7. In other words, the gripping area of the nail relative to the shaft part 4 of the nail 2 increases markedly compared to that indicated in Patent Documents 1 through 3. This makes it possible to retain the nail 2 securely at a position which is vertical to the pair of upper and lower unit retaining parts 6, 6 (and by extension, both upper and lower belt-shaped bodies, 5,5). As a result, the nail 2 can be driven in a straight line (in a stable position) relative to the members A and B.

In addition, in the first practical embodiment of the present invention, both the upper and lower belt-shaped bodies 5,5 are disposed so that the group of gripping parts 7,7 respectively protrude in a direction where they face each other along the axial direction of each of the nails 2. As a result, since the shaft part of the nail 2 is long, when the intervals at which both the upper and lower belt-shaped bodies 5,5 are disposed are made as large as possible, the weakened parts 8,8 which are linked to the upper unit retaining part 6 are torn off and even if they are at a position which retains the position of the nail 2 just by the unit gripping part 6 (see FIG. 4(*a*)), the lower gripping part 7 can grip a range which is comparatively close to the center of gravity of the nail 2. As a result, the nail 2 can be retained at an exact position up to an interval where it separates from both belt-shaped bodies 5,5 (the position retaining function of the nail 2 can be maintained and secured as much as possible).

In addition, since multiple nails 2 can be connected and retained at a stable vertical position on the two belt-shaped bodies 5,5, the group of one type of belt-shaped bodies 5,5 can be combined for example with a nail 2 which has a long shaft part and with a nail 2 which has a short shaft part and different types of connecting nails can be easily manufactured. This means that the belt-shaped body 5 need not be manufactured to fit the difference of the length of the nail 2 and the belt-shaped body 5 is flexible for various uses so that it contributes to keeping down manufacturing costs.

Next, we shall explain an example of the manufacturing process involved in manufacturing the belt-shaped body 5.

Each of the gripping parts 7 of the belt-shaped bodies 5 uses a punch 11 which is provided with a protruding shaft part 12 and a die 13 which is provided with a receiving hole 14 and it is formed by burring a tie plate 15 which is made of a flexible material such as synthetic resin and the like.

The tie plate 15 which is made of a synthetic resin is provided with a substance which can be easily flared in a cylindrical die by using forced pressurization. As a result, by pressing out the appropriate locations on the tie plate 15 using a punch 11 looking across the spring back the gripping part 7 can be processed at a high degree of precision. Further, driving the peripheral part of the unit retaining part 6 and the through hole 9 is carried out either before or after the gripping part 7 is burred.

Next, we shall explain another mode of driving the nail 1 referring to FIG. 6. In this embodiment, both belted bodies 5,5 are made of a comparatively soft synthetic resin such as polyethylene.

When the nail is being driven, the weakened parts 8,8 which are linked to each of the unit retaining parts 6 relative to the nail 2 which has been driven are torn off from above. The two unit retaining parts 6,6 are inserted into the shaft part 4 of the nail 2 which has been punched out.

Next, both the upper and lower gripping parts 7,7 which are made of a soft synthetic resin become swollen and deformed so that the middle piece along the axial direction spreads radially to the outside by the crushing action between the head part 3 of the nail 2 and the member A (see FIG. 6 (*a*)).

Then, both the gripping parts 7,7 assume a position where they are folded in two at the stage when the driving is completed. The two unit retaining parts 6,6 clamp the gripping parts 7,7 so that they are folded in two between the head part 3 of the nail 2 and the member A (see FIG. 6 (*b*)).

This makes it possible to bring out to the fullest extent the function as a washer which protects the member A from being damaged on the head part 3 of the nail 2. At the same time, a great elastic restitutive force acts relative to the head part 3 of the nail 2 and the member A so that the sealing function between the head part 3 of the nail 2 and the member A is improved.

Thus, if a synthetic resin is used for the material of the belt-shaped body 5 using a synthetic resin substance (hard, weak), it is easy for the unit retaining part 6 to be left in a washer state and the entire body will be scattered.

Further, the mode of the weakened parts 8,8 which connect the unit retaining parts 6,6 which are adjacent need not necessarily be limited to a bridging shape (narrow width) but a perforated shape or a thin shape or modes which are a combination of these may be used. For example, as indicated in FIG. 7(*a*) and FIG. 7(*b*), a notched groove 16 may be shaped on one or both of the upper and lower surfaces of the linking parts of the adjacent unit retaining parts 6,6 instead of the aforementioned through hole 7.

Figure 8:
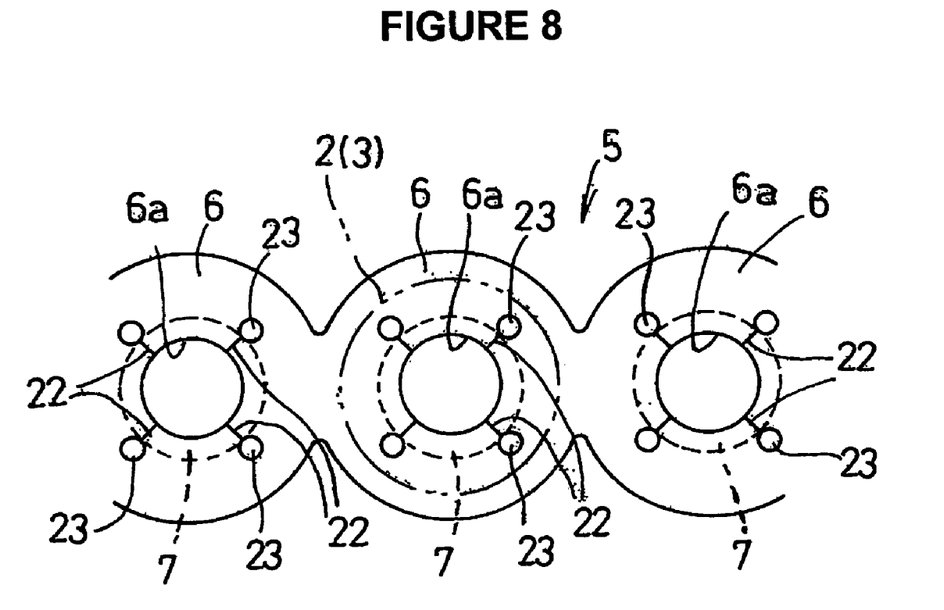
FIG. 8 A plane view of the belt-shaped body in the second practical embodiment of the present invention.
Figure 9:
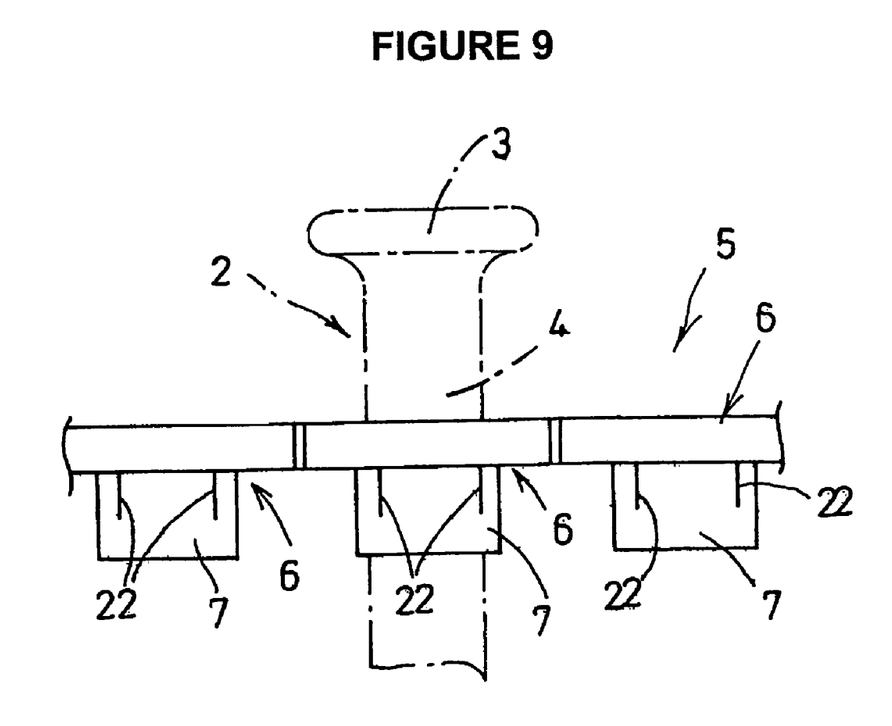
FIG. 9 A frontal view of the belt-shaped body.

FIG. 8 and FIG. 9 indicate a second embodiment of the connecting nail 21 which is configured so that the nail 2 is driven out from both the upper and lower belt-shaped bodies 5,5. FIG. 8 is a plane view of the belt-shaped body in the second practical embodiment of the present invention. FIG. 9 is a frontal view of the belt-shaped body.

In the second practical embodiment of the present invention, no through hole is made on the lining part of the adjacent unit retaining parts 6,6 of each of the belt-shaped bodies 5.

This means that the weakened parts have been eliminated. Then, multiple slits 22 (in this embodiment, four) which extend radially and small holes 23 which communicate with the front end of each of the slits 22 are formed on the periphery of each of the gripping parts 7 to make it easier for the head part 3 of the nail 2 to pass through. Each of the slits 22 extends as far as the center lengthwise on the gripping part 7. Each of the small holes 23 and the head part 3 of the nail 2 are set at a position wherein the outside edge of the head part 3 of the nail 2 overlaps with the small hole 23 when viewed on a plane. The rest of the structure is the same as that in the first practical embodiment of the present invention.

Based on the aforementioned structure, when the nail 2 is being driven, only the nail 2 is pushed out without cutting off the unit retaining parts 6,6 which are arrayed in a row on the top and on the bottom from the belt-shaped bodies 5,5. Even in this case, the two unit retaining parts 6,6 on both belt-shaped bodies 5,5 and the gripping parts 7,7 which are formed on both unit retaining parts 6,6 support two locations along the axial direction of a single nail 2 so that a large gripping area relative to the heat part 4 of the nail 2 can be taken. As a result, the same type of action and effect can be obtained as in the first practical embodiment of the invention.

Further, the mode for the slit 22 is by no means restricted to the aforementioned broken line shape and it may have a groove shape with some intervals open. The mode for the small holes 23 need not necessarily be restricted to a completely round shape and an oval shape or a triangular shape or other shape may also be used. The small holes 23 may be formed directly onto the gripping part 7 without setting in place any slits 22.

Figure 10:
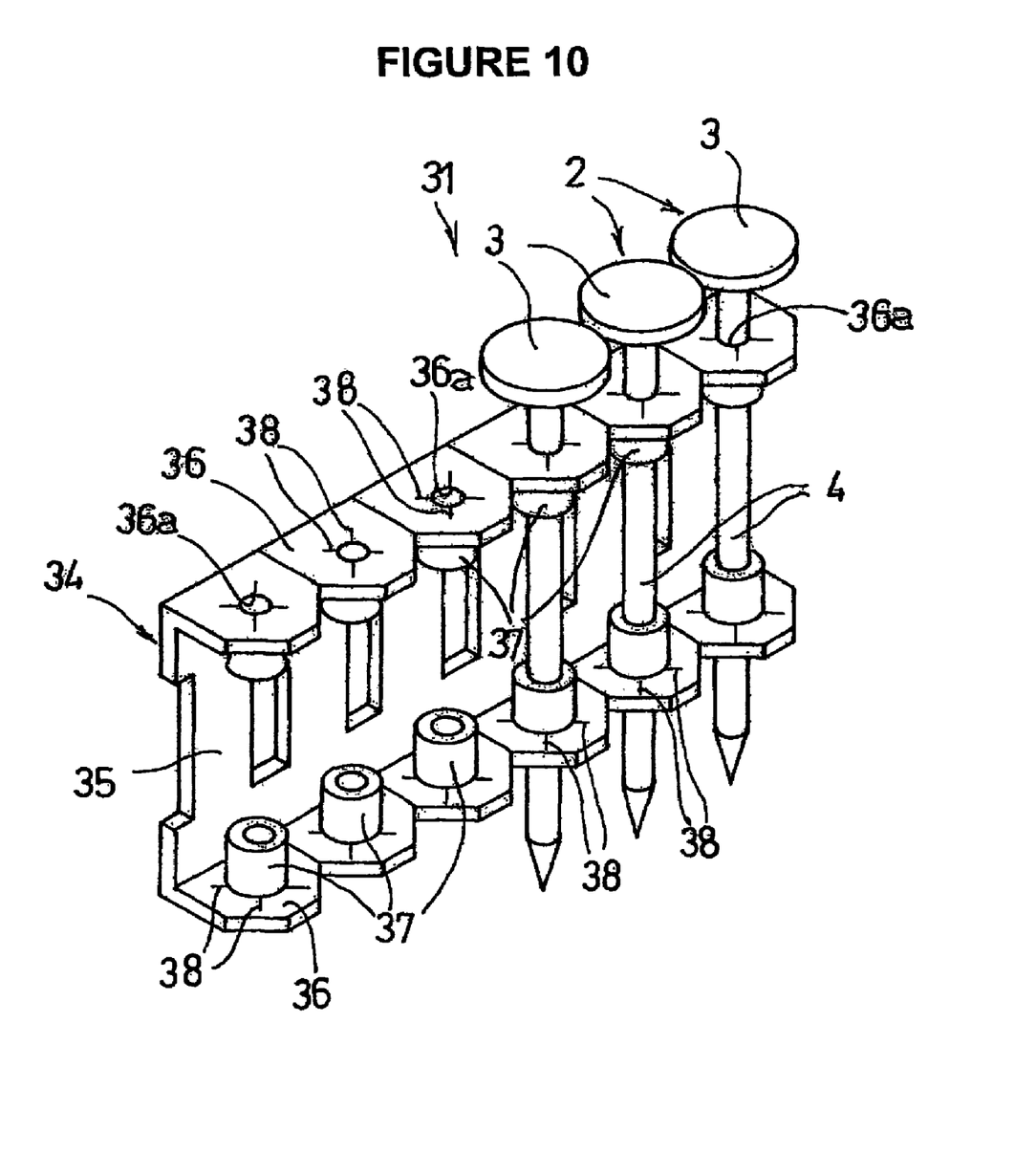
FIG. 10 An inclined view of the connecting nail in the third practical embodiment.

FIG. 10 is a third practical embodiment of the present invention which applies the present invention to a connecting nail 31 on which the fastener holder shape is different from that in the first and second practical embodiments.

In the third practical embodiment of the present invention, the connecting body 34 which is made of a flexible material such as synthetic resin and rubber and the like has a pair—upper and lower—of holder parts 36,36—which protrude in the same direction and which are formed on both side edges in the lengthwise direction of a back part 35 which extends so that it forms a schematic radial shape. As a result, the connecting body 34 is shaped like a box with the left hand side removed when seen in schematic cross-section. In the third practical embodiment of the present invention, the pair—upper and lower—of holder parts 36,36 corresponds to the belt-shaped part which is described in the claims. This group of holder parts 36 may have a structure whereby the adjacent [parts] are separated from one another by using slits and the like and may have a structure wherein they are linked to one another so that they form an integral piece.

The group of nails 2 is in position where the head part 3 is positioned on one side of one of the holder parts 34 and the shaft part 4 passes through both holder parts 36,36 and are inserted at appropriate intervals along the lengthwise direction of both holder parts 36,36.

A large number of nail through holes 36a through which the nail 2 is passed are made at appropriate intervals along the lengthwise direction of the holder part 36 A cylindrical gripping part 37 which grips the shaft part of a single nail 2 is provided on a single side of each of the holder parts 36. This gripping part 37 communicates with the nail through hole 36a.

The two gripping parts 37, 37 which are arranged in a single row along the axial direction of each of the nails 2 of both holder parts 36,36 support a single nail 2 at two locations: one location which approaches the head part and another location which approaches the front end. Even in the third practical embodiment of the present invention, the group of gripping parts 37 on both holder parts 36,36 protrudes in a direction where they face one another along the axial direction of each of the nails 2.

Multiple slits 38 (in this embodiment, four) which extend radially are formed around the gripping part 37 to make it easier for the head part 3 of the nail 2 to go through. Each of the slits 38 extends up to the middle—seen lengthwise—of the gripping part 37.

By using this configuration, when the nail 2 is driven, only the nail 2 is driven out from the connecting body 34. Even in this case, the pair—upper and lower—of the holder parts 36,36 on the connecting body 34 and the gripping parts 37,37 which are formed on these holder parts 3,36 supports two locations along the axial direction of a single nail 2. As a result, the gripping area relative to the shaft part 4 of the nail 2 can be made larger. As a result, the same type of action and effect as the first practical embodiment can be obtained.

The present invention may be applied to a variety of different modes in addition to the ones indicated in the practical embodiments. For example, the fastener need not be a nail but may be a screw, a pin or any other shape which has a head part on one end of the shaft part.

In addition, the fastener holder is no by no means restricted to a synthetic resin, rubber or other material and it may be made of paper. When the fastener holder is made of synthetic resin, it need not necessarily be formed by burring but may be formed by injection.

Both upper and lower belt-shaped bodies 5, 5 need not necessarily be disposed so that they force the group of gripping parts 7,7 respectively to protrude in a direction where they face each other along the axial direction of each of the nails 2. They may be disposed so that they protrude so that they face away from each other or disposed so that they face the same direction.

Figure 11:
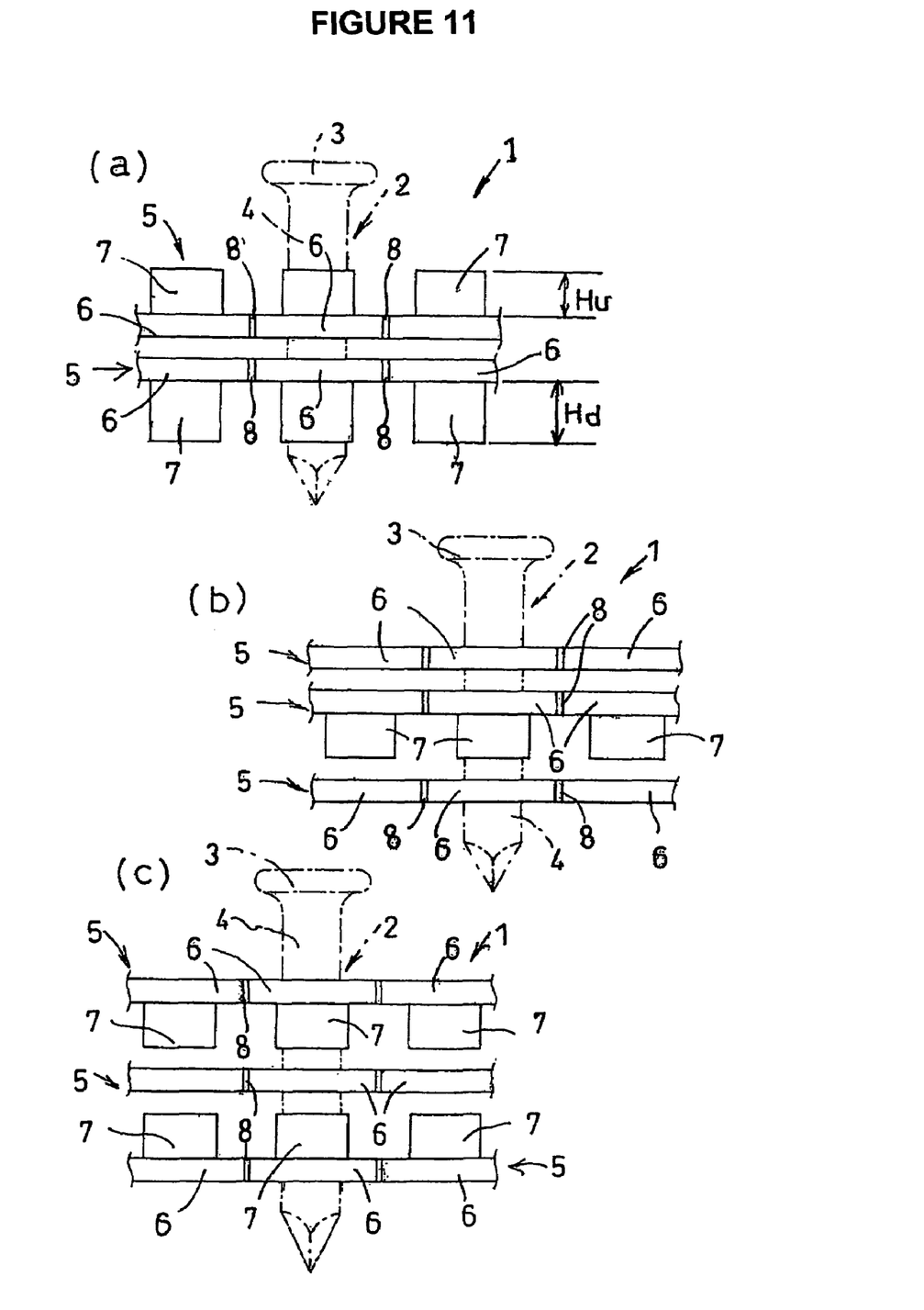
FIG. 11 A diagram indicating the connecting nail in another practical embodiment.

There may be 3 or more belt-shaped bodies 5 in the first and second practical embodiments of the present invention. In this case, as indicated in FIG. 11(*b*) and FIG. 11(*c*), the gripping part 7 may be formed on at least one of the belt-shaped bodies 5. In addition, the disposition pattern of the belt which does not have a gripping part 7 and the belt-shaped body which does have a gripping part 7 attached may be set at will. The shape of the belt-shaped body 5 need not necessarily be restricted to the structure which links the adjacent unit retaining part 6 at the weakened part 8 and may just as well be shaped to form a rectangular plane. In this case, a latching groove which is used for transferring on the power operated driving tool may be shaped at an appropriate pitch.

The mode of the gripping parts 7,37 need not necessarily be restricted to a cylindrical shape and may be shaped like an angular tube and other shapes. In addition, the height at which the gripping parts 7,37 protrude may be different for each belt-shaped body 5 (for example, see FIG. 11(*a*)) and may just as well be changed for each gripping part 7,37. In FIG. 11(*a*), the protruding height Hd of each of the gripping parts 7 on the lower belt-shaped body 5 has been set so that it is larger than the protruding height H of each of the gripping parts 7 on the upper belt-shaped body 5.

The gripping parts 7,37 may be linked to a fastener holder by bonding using a bonding agent or bonding or other some such method using a heat seal. Even the gripping part 37 in practical embodiment 3 should be formed on at least one holder part 36.

The invention claimed is:

1. A fastener holder and a plurality of connecting fasteners which are held by the holder and adapted to be used in association with a power operated device said holder comprising:
   a first elongated body; and
   a second elongated body spaced from the first elongated body along a shank of each of the fasteners,
   each of the elongated bodies comprising:
      a plurality of fastener retaining parts, each of the retaining parts defining a first opening of a through hole that receives the shank of the respective fastener;
      a plurality of gripping parts, each supported by the respective retaining part and extending along the shank of the fastener and defining a second opening of the through hole; and
      a weakened part connecting the respective adjacent fastener retaining parts, wherein
      each of the gripping parts engages a greater length of the shank of the respective fastener than the respective fastener retaining part, and each of the gripping parts of the first elongated body and the respective gripping part on the second elongated body are physically separate and detached from each other before the fastener is driven into a member; and
   when the fastener is driven into the member by the power operated device, said retaining parts and the gripping parts are adapted to be compressed and remain on the shank of the fastener thereby providing a sealing effect and forming a washer.

2. The fastener holder and the fasteners of claim 1, wherein each of the two belt-shaped bodies are soft synthetic resin.

3. A fastener holder for housing a plurality of connecting fasteners for use with a power operated device, said fastener holder comprising an elongated body having:
   a plurality of upper parts;
   a plurality of lower parts;
   a plurality of intermediate parts each connecting the respective upper part and the lower part along corresponding edges of the upper and lower parts, wherein
   each of the upper and lower parts has
      a through hole;
      a fastener retaining part defining a first opening of the through hole; and
      a gripping part supported by the respective retaining part and extending along a central axis of the through hole and defining a second opening of the through hole, wherein
   the central axes of the respective through holes of the upper and lower parts are aligned for receiving together shanks of the fasteners; and
   each of the intermediate parts spaced away, in a lateral direction, from the respective gripping part.

4. The fastener holder and the fasteners as claimed in claim 1, wherein the gripping parts of the first and second bodies that hold the same fastener extend towards each other.

5. The fastener holder and the fasteners as claimed in claim 4, wherein a third elongated body is disposed in between the first and second bodies, said third elongated body comprising a plurality of fastener retaining parts, each of the fastener retaining parts holds a portion of the shank of the respective fasteners disposed in between the first and second elongated bodies.

6. The fastener holder and the fasteners as claimed in claim 1, wherein the weakened part has a narrow width than a width of the respective retaining parts in a direction transverse to a central axis of the fastener and defines an aperture therethrough.

7. The fastener holder and the fasteners as claimed in claim 1, wherein the weakened portion is perforated.

8. The holder of claim 3, wherein each of the upper parts, lower parts, intermediate parts and the gripping parts are synthetic resins.

9. The holder of claim 3, wherein adjacent intermediate parts define a weakened portion therebetween.

10. The fastener holder and the fasteners as claimed in claim 1, wherein the gripping part has an outer circumferential dimension lesser than that of the respective retaining part.

11. The fastener holder and the fasteners as claimed in claim 10, wherein a thickness of each of the gripping parts in a radial direction of the respective through hole is less than a thickness of the respective fastener retaining parts on an axial direction of the through hole so that the gripping parts are adapted to be curved when the fastener is driven into the member and are eventually folded between the respective fastener retaining parts.

12. A fastener holder and a plurality of connecting fasteners which are held by the holder and adapted to be used in association with a power operated device, said holder comprising:
   a first elongated body; and
   a second elongated body spaced from the first elongated body along a shank of the fastener,
   each of the elongated bodies comprising:
      a plurality of fastener retaining pans, each of the retaining parts defining a first opening of a through hole that receives the shank of the fastener;
      a plurality of gripping pans, each supported by the respective retaining part and extending along the shank of the fastener and defining a second opening of the through hole; and
      a weakened part connecting the respective adjacent fastener retaining parts, wherein
   each of the gripping parts, in a radial direction of the through hole, has a width less than that of the respective retaining part; and
   each of the gripping parts of the first body extends away from the respective retaining part and towards an end of the respective fastener;
   each of the gripping parts of the second body extends away from the respective retaining part and towards the other end of the fastener; and
   each of the gripping parts of the first elongated body and the respective gripping part on the second elongated body are physically separate and detached from each other before the fastener is driven into a member.

13. The holder of claim 3, wherein the first and second openings of the through hole define a plurality of slits extending away from a circumference of the openings.

14. The holder of claim 3, wherein the upper parts, lower parts, intermediate parts and the gripping parts constitute a single-piece, molded body.

15. The holder of claim 9, wherein the weakened portions are elongated openings.

16. The holder of claim 3, wherein each of the intermediate parts directly connect the fastener retaining parts of the respective upper and lower parts.

17. The holder of claim 16, wherein the respective gripping parts of the upper and lower parts extend from the respective retaining part towards each other.

18. The fastener holder and the fasteners as claimed in claim 12, wherein each of the gripping parts engages a greater length of the shank of the respective fastener than the respective fastener retaining part.

19. The fastener holder and the fasteners as claimed in claim 12, wherein the gripping part has an outer circumferential dimension lesser than that of the respective retaining part.

20. The fastener holder and the fasteners as claimed in claim 12, wherein the weakened part has a narrow width than a width of the respective retaining parts in a direction transverse to a central axis of the fastener and defines an aperture therethrough.

* * * * *